United States Patent
Kang et al.

(10) Patent No.: US 8,671,094 B2
(45) Date of Patent: *Mar. 11, 2014

(54) SYSTEM AND METHOD FOR PROVIDING DOCUMENT BASED ON PERSONAL NETWORK

(75) Inventors: In Ho Kang, Seongnam-si (KR); Soo Hyun Kim, Seongnam-si (KR); Chan Hoon Park, Seongnam-si (KR)

(73) Assignee: NHN Corporation, Kyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,102

(22) Filed: Sep. 21, 2011

(65) Prior Publication Data
US 2012/0084318 A1 Apr. 5, 2012

(30) Foreign Application Priority Data
Oct. 1, 2010 (KR) ........................ 10-2010-0096070

(51) Int. Cl.
*G06F 17/30* (2006.01)

(52) U.S. Cl.
USPC .......................................... 707/730

(58) Field of Classification Search
USPC ................. 707/769, 708, 728, 730
See application file for complete search history.

(56) References Cited

U.S. PATENT DOCUMENTS

| | | | | |
|---|---|---|---|---|
| 7,047,202 B2 * | 5/2006 | Jaipuria et al. | ............. | 705/51 |
| 7,359,894 B1 * | 4/2008 | Liebman et al. | ............. | 1/1 |
| 7,921,167 B2 * | 4/2011 | Shroff et al. | ............. | 709/206 |
| 7,958,457 B1 * | 6/2011 | Brandenberg et al. | ........ | 715/789 |
| 8,122,047 B2 * | 2/2012 | Kanigsberg et al. | ......... | 707/765 |
| 8,161,083 B1 * | 4/2012 | Wood et al. | ............. | 707/804 |
| 8,204,878 B2 * | 6/2012 | Amer-Yahia et al. | ........ | 707/723 |
| 2005/0216823 A1 * | 9/2005 | Petersen et al. | ............ | 715/501.1 |
| 2006/0089913 A1 * | 4/2006 | Jaipuria et al. | ............. | 705/51 |
| 2007/0078838 A1 * | 4/2007 | Chung | ............. | 707/3 |
| 2007/0203906 A1 * | 8/2007 | Cone et al. | ............. | 707/6 |
| 2008/0104225 A1 * | 5/2008 | Zhang et al. | ............. | 709/224 |
| 2008/0255977 A1 * | 10/2008 | Altberg et al. | ............. | 705/35 |
| 2009/0006388 A1 * | 1/2009 | Ives et al. | ............. | 707/5 |
| 2009/0204599 A1 * | 8/2009 | Morris et al. | ............. | 707/5 |
| 2010/0145965 A1 * | 6/2010 | Basson et al. | ............. | 707/758 |
| 2010/0153215 A1 * | 6/2010 | Abraham | ............. | 705/14.55 |
| 2010/0174709 A1 * | 7/2010 | Hansen et al. | ............. | 707/728 |
| 2011/0106835 A1 * | 5/2011 | Lauridsen et al. | ............. | 707/769 |
| 2011/0113094 A1 * | 5/2011 | Chunilal | ............. | 709/204 |

(Continued)

FOREIGN PATENT DOCUMENTS

JP 2002-169987 6/2002
JP 2007-287046 11/2007

*Primary Examiner* — Cam-Linh Nguyen
(74) *Attorney, Agent, or Firm* — Harness, Dickey & Pierce, P.L.C.

(57) ABSTRACT

Provided are a system and method for providing a document based on a personal network. The document providing system may include a community searching unit to search for a community associated with a first document prepared by a first user, a document registration unit to register the first document in the searched community, and to receive a second document, associated with the first document, registered by a second user included in the community, and a document providing unit to provide the second document associated with the first document. According to embodiments of the present invention, a response that the first user may desire may be provided by receiving a response, registered by the second user included in the community associated with the first user, with respect to the document prepared by the first user.

10 Claims, 7 Drawing Sheets

(56) References Cited

U.S. PATENT DOCUMENTS

| | | | |
|---|---|---|---|
| 2011/0113349 A1* | 5/2011 | Kiciman et al. | 715/753 |
| 2011/0126258 A1* | 5/2011 | Emerson et al. | 725/133 |
| 2011/0153423 A1* | 6/2011 | Elvekrog et al. | 705/14.53 |
| 2011/0179019 A1* | 7/2011 | Amer-Yahia et al. | 707/723 |
| 2012/0047448 A1* | 2/2012 | Amidon et al. | 715/753 |
| 2012/0054645 A1* | 3/2012 | Hoomani et al. | 715/758 |
| 2012/0054646 A1* | 3/2012 | Hoomani et al. | 715/758 |
| 2012/0065969 A1* | 3/2012 | DeLuca et al. | 704/235 |

* cited by examiner

SYSTEM AND METHOD FOR PROVIDING DOCUMENT BASED ON PERSONAL NETWORK

CROSS-REFERENCE TO RELATED APPLICATION

This application claims priority from and the benefit of the Korean Patent Application No. 10-2010-0096070, filed on Oct. 1, 2010, which is hereby incorporated by reference for all purposes as if fully set forth herein.

BACKGROUND OF THE INVENTION

1. Field of the Invention

Exemplary embodiments of the present invention relate to a system and method for providing a document based on a personal network, and more particularly, to a method and system for providing a response upon receiving a query, by receiving a response registered by a personal network associated with the user.

2. Discussion of the Background

Recently, a service associated with a social network, such as a cafe, a blog, and a community has been expanded and adopted as an accepted mode of communication for business and personal uses. Consequently, a user may need to access a social network and make a post in order to obtain desired information from the corresponding social network joined by the user. However, there may be an inconvenience for the user to join a social network in order to obtain a desirable response with respect to a query from the corresponding social network.

From a point of view of a social network, to be competitive, service providers may need to address a revolutionary procedure for attracting many subscribers. For example, a simple approach to introduce a cafe, a blog, and a community may fail to attract the user to join the social network. Moreover, a targeted join request may be difficult for a user who may be likely to actively participate in the corresponding social network.

Accordingly, there is a need for an approach that may provide a user with enhanced social network service, for example, receiving a response with respect to a document prepared by the user via a social network, and transferring a join request to a user who may be likely to actively participate in the social network, and attracting the user to join the social network.

SUMMARY OF THE INVENTION

These and other needs are addressed by the present invention, in which exemplary embodiments of the present invention provide a system and method for providing a response with respect to a document prepared by a user by receiving the response registered by another user included in a community associated with the user or a neighbor of the user so that the user having prepared the document may more conveniently receive the response.

Exemplary embodiments of the present invention also provide a system and method for attracting a user who may be likely to actually participate in a community, by recommending a community associated with the user having prepared the document and a neighbor of the corresponding user.

Additional features of the invention will be set forth in the description which follows, and in part will be apparent from the description, or may be learned by practice of the invention.

Exemplary embodiments of the present invention disclose a system using a server including a processor for providing a document. The system includes a community searching unit configured to search for a community associated with a first document provided by a first user. The system also includes a document registration unit, executed by the processor, configured to register the first document in the searched community, and to receive a second document, associated with the first document, registered by a second user included in the community. And the system includes a document providing unit configured to provide the second document associated with the first document.

Exemplary embodiments of the present invention disclose a method. The method utilizing a processor includes searching for a community associated with a first document prepared by a first user. The method also includes receiving a second document, associated with the first document, registered by a second user included in the community in response to detection of the first document being registered in the searched community. The method includes providing the second document associated with the first document.

Exemplary embodiments of the present invention disclose an apparatus. The apparatus includes a processor configured to search for a network community associated with a first document corresponding to a first profile of a first user by comparing a keyword of the first document with a keyword of a second document corresponding to a second profile of a second user of the searched network community. The second document is retrieved from the searched network community and provided to the first user, and wherein the first document corresponding to the first profile of the first user is displayed to the second user and the second document corresponding to the second profile of the second user is displayed to the first user via an interface distinguished from displaying a third document registered in the searched network community.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
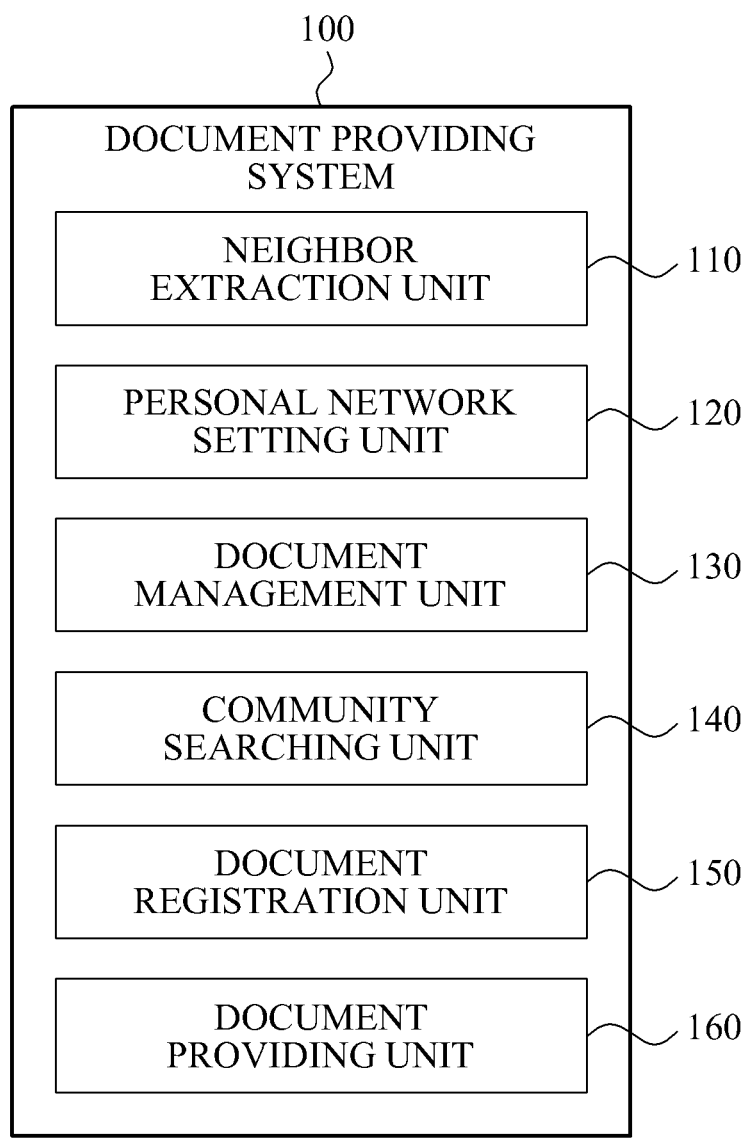
FIG. 1 is a diagram illustrating a configuration of a system for providing a document according to exemplary embodiments of the present invention.

Exemplary embodiments of the invention are described more fully hereinafter with reference to the accompanying drawings. The invention may, however, be embodied in many different forms and should not be construed as limited to the exemplary embodiments set forth herein. Rather, the exemplary embodiments are provided so that this disclosure is thorough and complete, and will convey the scope of the invention to those skilled in the art. In the drawings, the size and relative sizes of layers and regions may be exaggerated for clarity. Like reference numerals in the drawings denote like elements.

The terminology used herein is for the purpose of describing exemplary embodiments only and is not intended to be limiting to the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. A method of providing a document according to exemplary embodiments of the present invention may be performed by a system for providing a document.

FIG. 1 is a diagram illustrating a configuration of a system 100 for providing a document according to exemplary embodiments of the present invention.

For example, a first user may prepare a first document corresponding to a query. A second user may be referred to as a user who has joined a community of a personal network of the first user. The second user may register a second document corresponding to a response with respect to the first document via the community. A third document may be registered in a community joined by the second user, and the third document being distinguished from the first document prepared by the first user and the second document registered by the second user as the response with respect to the first document.

A neighbor may be referred to as a user extended through a user profile of the first user, which may be used as a medium for extracting a community associated with the first user, and may include the second user. A personal network may include at least one of a neighbor of the first user, a community joined by the first user, or a community joined by the neighbor of the first user.

Referring to FIG. 1, for example, the document providing system 100 may include a neighbor extraction unit 110, a personal network setting unit 120, a document management unit 130, a community searching unit 140, a document registration unit 150, and a document providing unit 160.

The neighbor extraction unit 110 may extract a neighbor having similar interests to that of the first user, using a profile of the first user. As an example, the profile of the first user may include user identification (ID) information, keywords included in a document prepared by the first user, ID information with respect to the neighbor of the first user.

For example, the neighbor extraction unit 110 may extract a neighbor of the first user, using the profile of the first user or neighbor information of the first user. In this example, the neighbor extraction unit 110 may extract the neighbor of the first user based on an association between keywords included in the profile of the first user, and keywords included in a profile of another user. In particular, when the association between the keywords included in the profile of the first user, and the keywords included in the profile of the other user is greater than a predetermined value, the neighbor extraction unit 110 may set the another user to be a neighbor of the first user.

According to exemplary embodiments of the present invention, the keywords constituting the profile of the first user may be determined based on keywords included in a document prepared by the first user. In this example, the document prepared by the first user may be referred to as a post uploaded by the first user to multiple web sites, such as a cafe, a blog, and a personal homepage. However, the document prepared by the user may include a query prepared by the first user, that is, the first document. The keywords constituting the profile of the first user may be extracted based on a frequency of the keywords included in the document prepared by the first user. For example, the keywords included in the document prepared by the first user may be arranged based on a frequency, and top n keywords may be determined to be the keywords constituting the profile of the first user.

The neighbor information of the first user may be determined based on at least one of a social network of the first user, an e-mail address book, and RSS (Really Simple Syndication) subscription information. For example, users included in a social network, for example, blog neighbors, community members, and micro-blog friends, users included in an e-mail address book, and other users subscribing the same Really Simple Syndication (RSS) may be targets of being neighbors of the first user can be neighbors of the first user.

The neighbor extraction unit 110 may extract, based on the profile of the first user, another user having similar interests to that of the first user to be a neighbor, among neighbors extracted based on the neighbor information of the first user. For example, the profile of the first user may include the keywords included in the document prepared by the first user, thus may reflect recent interests of the first user. The interests of the first user may be time dependent changeable information, thus the keywords included in the document prepared by the first user may be variable. For example, the first user may be currently interested in a keyword A, however, may be interested in a keyword B in later e.g., the next day, in a week, or in a month. Accordingly, the keywords constituting the profile of the first user may be time dependent changeable information. Also, the keywords constituting the profile of the first user may be changeable dependent on an age of the first user. According to the change of the keywords, the neighbor of the first user may also be changed, and another user can be determined to be the neighbor of the first user when another is currently having similar interests to that of the first user.

According to exemplary embodiments of the present invention, the neighbor extraction unit 110 may extract a first neighbor having similar interests to that of the first user, and extract an Nth neighbor, having the similar interests to that of the first user, by extending neighbors based on the first neighbor, where N may be a value greater than 2. A relationship between people on a social network may be connected via a particular medium, such as a blog, and a micro-site. Moreover, in view of the fact that associations between people on a social network may be generated when the people have similar interests, the neighbor may be continuously extended and extracted based on the first user.

For example, the personal network setting unit 120 may set at least one of a community joined by the first user, the neighbor of the first user, or a community joined by the neighbor, to be a personal network of the first user. That is, the personal network may include a neighbor and a community. The neighbor may include a neighbor from a first neighbor of the first user and the neighbor can be expanded to an Nth neighbor. For example, the community joined by the first user may be extracted based on activities of the first user in the community, and the community joined by the neighbor may be extracted based on activities of the neighbor in the community.

Here, a personal network of another user, having similar interests to that of the first user, may be set by the neighbor extraction unit 110 and the personal network setting unit 120. Since the interests of the first user may be unfixed and time dependent changeable information, the personal network of the first user may be variable.

In this example, the personal network setting unit 120 may generate a community profile including community ID information, keywords of a document included in the community, and ID information of a user who has joined the community, with respect to each community. Also, the personal network setting unit 120 may add, to the user profile of the first user, community ID information of the community joined by the neighbor of the first user, a document prepared by the neighbor in the community, and keywords of the document prepared by the neighbor.

The document management unit 130 may manage the first document prepared by the first user. For example, the document management unit 130 may manage the first document corresponding to a query registered by the first user on multiple sites. In this example, the first document may correspond to a document registered in the community joined by the first user. For example, the document management unit 130 may collect the first document prepared by the first user from a site, on a real time basis or a periodic basis.

The community searching unit 140 may search for a community associated with the first document prepared by the first user.

In this example, the community searching unit 140 may search for the community associated with the first document, among communities joined by the first user or communities joined by the neighbor having similar interests to that of the first user.

As an example, the community searching unit 140 may search for a community associated with a document corresponding to the profile of the first user among documents prepared by the first user. In particular, the community searching unit 140 may search for a community associated with keywords included in the profile of the first user among the documents corresponding to a query prepared by the first user. Here, the profile of the first user may include representative keywords extracted based on a frequency of the keywords included in the first documents prepared by the first user.

Also, the community searching unit 140 may generate a candidate community group by grouping at least one community associated with the first document, and may provide the generated candidate community group to the first user. The first user may select a community from communities included in the candidate community group. A second document, associated with the first document, may be registered and received from the selected community.

When the first document is registered in the searched community, the document registration unit 150 may receive the second document, associated with the first document, registered by the second user who has joined the searched community. In particular, the document registration unit 150 may transfer the first document prepared by the first user to the community, and may receive the second document registered by the second user included in the community. As aforementioned, the second document may correspond to a response with respect to a query prepared by the first user, that is, the first document.

According to exemplary embodiments of the present invention, a response that the first user may desire may be provided via a social network of the first user, by providing the second document corresponding to the response with respect to the query prepared by the first user, whereby the second document may be prepared by the second user included in the community joined by the first user or the community joined by the neighbor of the first user.

In this example, the community may correspond to a community joined by the first user, or a community not yet joined by the first user. That is, the second document can be registered by the second user included in the community joined by the first user, or the community not yet joined by the first user.

Also, the document registration unit 150 may receive the second document registered by the second user included in a community selected by the first user from communities included in the candidate community group associated with the first user. That is, types of communities from which the registered second document may be received may be set by the first user, and thereby the registered second document may be received only from a community where intention of the first user being reflected.

For example, the document registration unit 150 may provide, to the second user, the first document prepared by the first user, through a first interface where the first document may be displayed to be distinguished from a third document registered in the community. That is, the second user may more conveniently register the second document by identifying the first document of the first user registered in the community through the first interface used to display the first document to be distinguished from the third document.

The first document prepared by the first user may be effectively exposed to the second user in the community through the first interface. Accordingly, the second user may easily register the second document corresponding to a response with respect to the first document prepared by the first user through the first interface.

The document providing unit 160 may provide, to the first user, the second document associated with the first document. For example, the document providing unit 160 may provide the second document by receiving the second document registered by the second user included in the community. The document providing unit 160 may provide, to the first user, the second document by placing the second document at a higher ranking when the community joined by the second user having registered the second document has a higher association with the first user.

In this example, the document providing unit 160 may integrally provide, to the first user, the first document prepared by the first user, and the second document with respect to the first document, through a virtual second interface. It is contemplated that by using the virtual second interface, the first user may not need to identify where the first document corresponding to a query prepared by the first user was prepared, and which community the first document was transferred to, and may also not need to join a community in order to receive the second document corresponding to a response with respect to the first document. The first user may easily receive the first document prepared by the first user and the response with respect to the first document through the second interface.

Also, the community searching unit 140 may receive, from the first user having received the second document, a join request for the community providing the second document which may satisfy the first user, among searched communities. In this example, the community being a target of the join request may correspond to a community not yet joined by the first user, and may correspond to a community joined by the neighbor of the first user. That is, the community being a target of the join request may receive the join request from the first user who may be likely to actively participate in the community, thereby more effectively attracting a member without advertising activities with respect to the targeted community.

Figure 2:
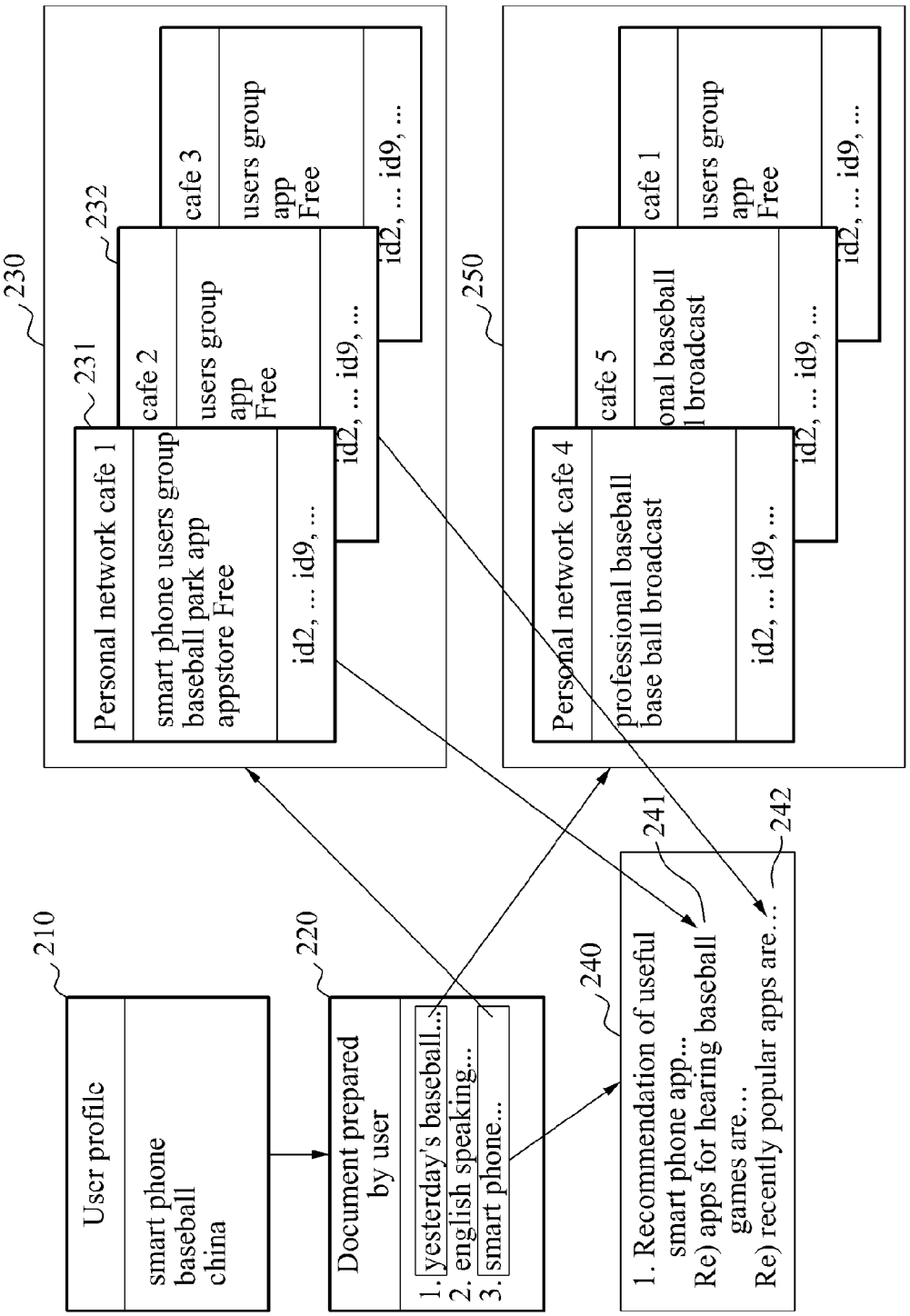
FIG. 2 is a diagram illustrating a process of providing a document according to exemplary embodiments of the present invention.

FIG. 2 is a diagram illustrating a process of providing a document according to exemplary embodiments of the present invention.

The document providing system may extract neighbors using keywords included in a user profile 210 of a first user, and may search for communities joined by the neighbors, for example, a community 230 and a community 250. In this example, the keywords constituting the user profile 210 of the first user may be extracted from keywords included in documents prepared by the first user.

Also, first documents prepared by the first user may be collected through a first interface 220. In this example, the first documents collected through the first interface 220 may be associated with the keywords constituting the user profile 210 among the documents prepared by the first user.

The first documents collected through the first interface 220 may be transferred to the searched communities 230 and 250. In this example, the first documents may be transferred to the searched communities 230 and 250. For example, when the first documents correspond to a query associated with "baseball," the first documents may be transferred to communities associated with "baseball."

Second documents 241 and 242 corresponding to the first documents may be registered by a second user who has joined the communities 230 and 250. The first documents may be exposed through a second interface 240 in the communities 230 and 250. The second user may register the second documents 241 and 242 corresponding to responses with respect to the first documents exposed through the second interface 240. The second user may easily identify the first documents through the second interface 240 where the first documents may be displayed to be distinguished from third documents already registered in the communities.

The second documents 241 and 242 respectively registered in the communities 230 and 250 may be provided to the first user through the first interface 220. The first user may transfer, to the communities, the first documents collected through the first interface 220, without separately inputting the first documents prepared in multiple sites to the communities. Also, the first user may easily identify the second documents registered by the second user with respect to the first documents, through the first interface 220 without joining the communities.

The document providing system may also recommend the searched communities to the first user. The first user may transfer a join request to communities providing a response that the first user may desire, for example, a personal network cafe 1, and a personal network cafe 2, among communities not yet joined by the first user. The personal network cafe 1 and the personal network cafe 2 may attract, as a member, the first user who may be likely to actively participate in the communities without separate advertising.

Figure 3:
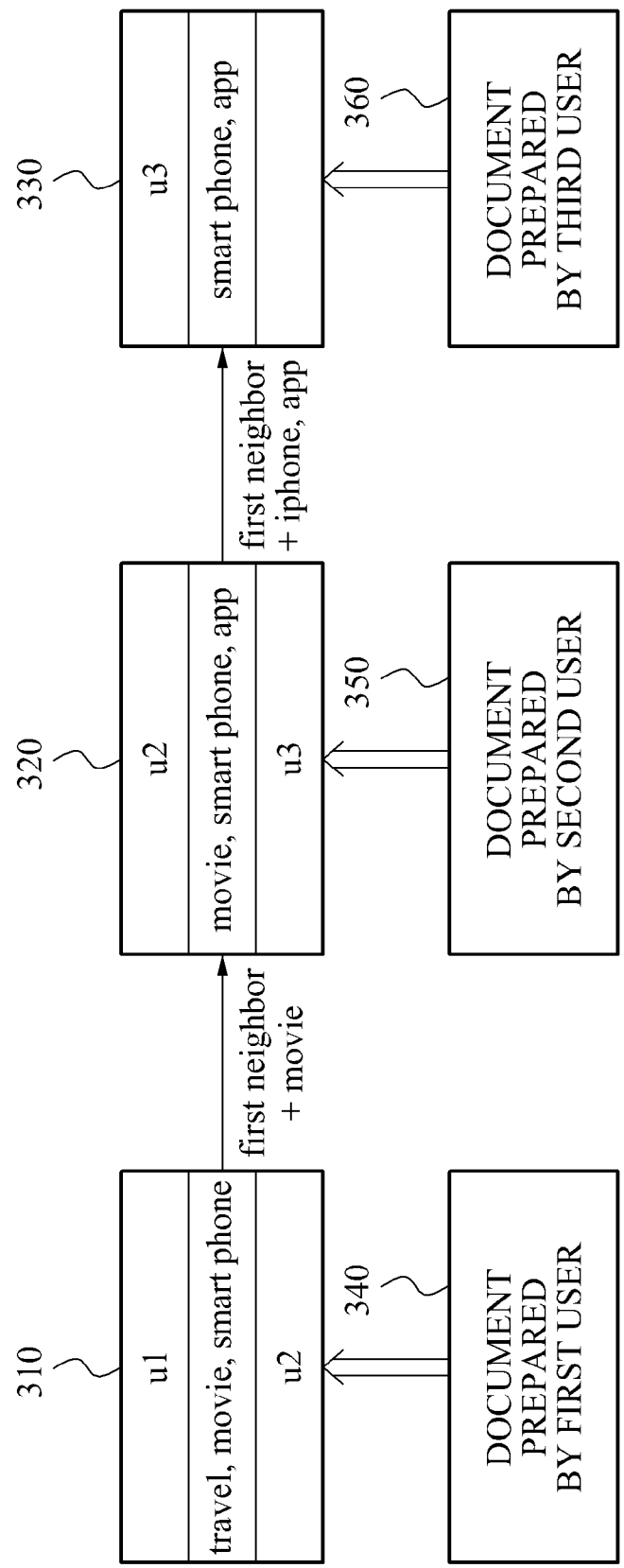
FIG. 3 is a diagram illustrating a process of extracting a neighbor of a first user according to exemplary embodiments of the present invention.

FIG. 3 is a diagram illustrating a process of extracting a neighbor of a first user according to exemplary embodiments of the present invention.

The neighbor extraction unit 110 may extract at least one other user to be a neighbor of the first user, based on an association between keywords included in a user profile 310 of the first user, and keywords included in a profile of the at least one of other users. In this example, the profile 310 of the first user may include user ID information, keywords, and ID information of a neighbor of the first user.

Referring to FIG. 3, profiles of each user are illustrated. Here, it may be assumed that a user u1 310 may correspond to a user having input a search term. As illustrated in FIG. 3, a profile of a user may include user ID information, keywords included in a document prepared by the user, and ID information of a neighbor of the user having input a search term.

As aforementioned, the keywords included in the documents prepared by the user may correspond to keywords included in documents where interests of the user may be indicated through a community, a site, a personal homepage, a cafe, and a blog, as an example.

Referring to FIG. 3, it may be assumed that a user u2 320 corresponding to a first neighbor of the user u1 310, and a user u3 330 corresponding to an extended second neighbor of the user u1 310 may be extracted. Here, the user u1 310 may refer to the first user. In this example, the user u2 320 corresponding to the first neighbor may be extracted by calculating an association between keywords of the user u1 310 and keywords of the user u2 320. The association between the keywords may be differently determined based on an identical relation, a synonym relation, and an extension relation between the keywords included in the profiles.

As an example, the keywords constituting the profile of the user u1 310 may be extracted from documents prepared by the user u1 310. Similarly, the keywords constituting the profile of the user u2 320 may be extracted from documents prepared by the user u2 320, and the keywords constituting the profile of the user u3 330 may be extracted from documents prepared by the user u3 330. For example, the keywords included in the profile of the user u1 310 may correspond to keywords included in an Nth ranking from a highest ranking, after arranging the keywords included in the documents prepared by the first user, based on a frequency.

Referring to FIG. 3, the user u2 320 may correspond to the first neighbor of the user u1 310. The user u3 330 may be extracted based on the user u2 320 corresponding to the first neighbor of the user u1 310. For example, the user u3 330 may be extracted by calculating an association between the keywords of the user u2 320 and the keywords of the user u3 330. The user u3 330 may be considered to be a second neighbor of the user u1 310, which may have similar interests to that of the user u1 310.

For example, as the association between the keywords included in the user profile of the user u2 320 and the keywords included in the profile of the user u1 310 may be high, and accordingly the user u2 320 may be extracted to be the neighbor of the user u1 310 as illustrated in FIG. 3. As an example, the association between the keywords included in the profile of the user u2 320, and the keywords included in the profile of the user u3 330 may be high, the user u3 330 may be extracted to be the neighbor of the user u1 310. In this instance, the user u2 320 may be defined as a first neighbor of the user u1 310. Also, the user u3 330 may be defined as a first neighbor of the user u2 320, and may be defined as a second neighbor of the user u1 310.

The neighbors having a relationship as neighbors with the user u1 310, extended from the first neighbor to the Nth neighbor may be continuously extracted. Here, N may be variable dependent on a configuration of the system. Also, the keywords of the user u1 310 constituting the profile may indicate current interests of the user u1 310, and may be time dependent changeable information. When the documents prepared by the user u1 310 are changed and accordingly the keywords included in the profile of the user u1 310 are also changed, neighbors of the user u1 310 may also be differently extracted from the exemplary embodiments of the FIG. 3.

Figure 4:
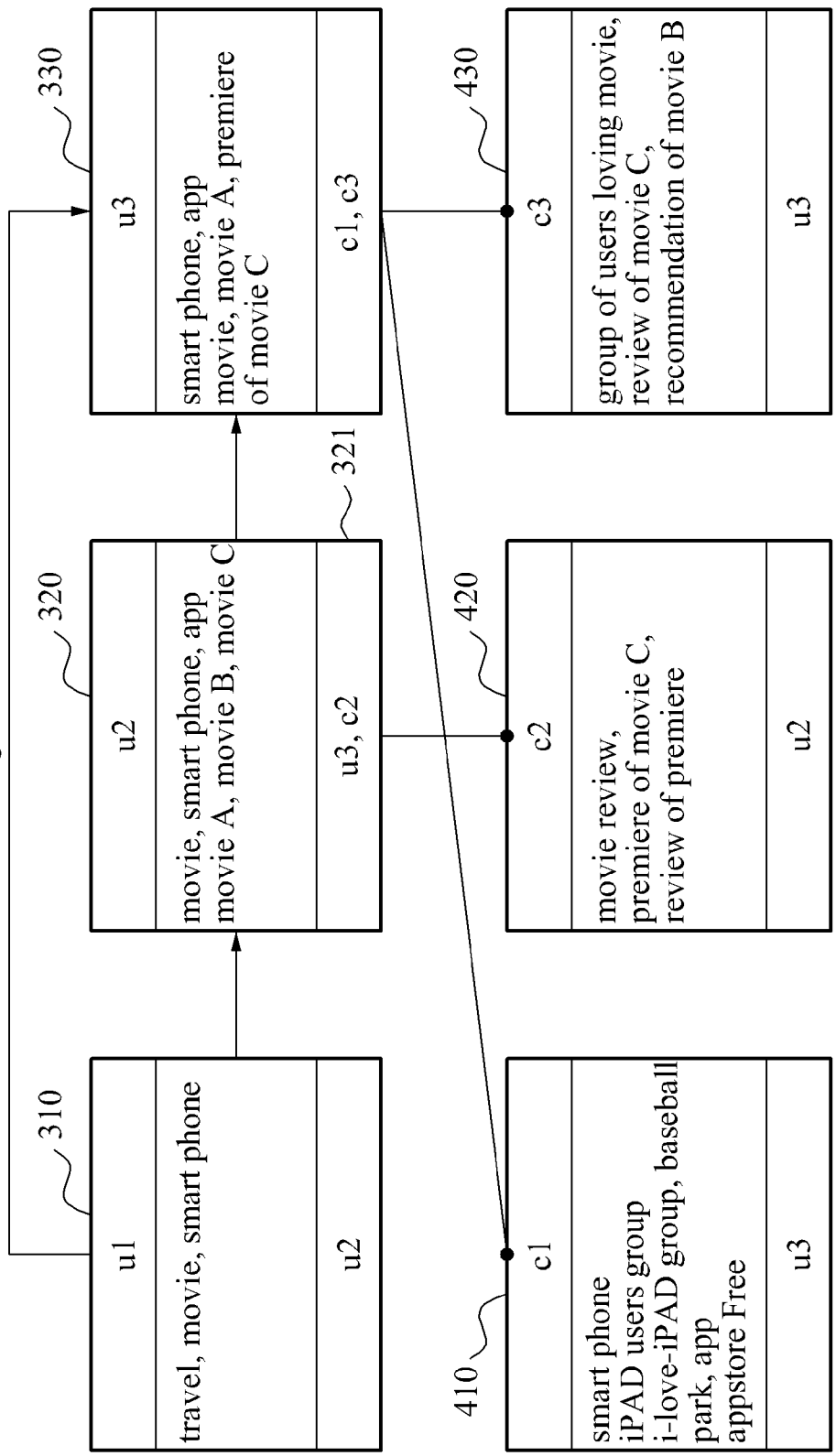
FIG. 4 is a diagram illustrating a process of setting a personal network of a first user according to exemplary embodiments of the present invention.

FIG. 4 is a diagram illustrating a process of setting a personal network of a first user according to exemplary embodiments of the present invention.

Profiles of communities may be generated as shown in FIG. 4. Here, the profiles of the communities may include community ID information, keywords of documents included in the communities, and ID information of users who have joined the communities, with respect to each of a community c1 410, a community c2 420, and a community c3 430.

As aforementioned with reference to FIG. 3, the user u2 320 and the user u3 330 may be extracted to be neighbors of the user u1 310, that is, the first user. The user u2 320 may correspond to a first neighbor of the user u1 310, that is, the first user, and the user u3 330 may correspond to a second neighbor of the user u1 310. That is, the user u3 330 may be referred to as a neighbor extended from the user u2 320 corresponding to the first neighbor of the user u1 310. Here, the user u2 320 and the user u3 330 may also be referred to as a user group including a plurality of users.

The user u2 320 may correspond to a neighbor of the user u1 310, extracted based on the keywords included in the profile of the user u1 310, and the profile of the user u2 320. The user u3 330 may correspond to a first neighbor of the user u2 320, which may be extracted based on the keywords included in the profile of the user u2 320 and the profile of the user u3 330, and may also correspond to a second neighbor of the user u1 310, that is, the first user.

The personal network setting unit 120 may set, to be personal networks of the user u1 310, the communities joined by at least one of the user u2 320 or the user u3 330 corresponding to the neighbors of the user u1 310, for example, a community c1 410, a community c2 420, and a community c3 430. Also, the personal network setting unit 120 may set communities joined by the user u1 310 to be a personal network of the user u1 310.

The personal networks of the user u1 310 may include neighbors of the user u1 310, for example, the user u2 320 and the user u3 330, communities joined by the user u1 210, or communities joined by each of the user u2 320 and the user u3 330. Although the communities joined by each of the user u2 320 and the user u3 330 may not be joined directly by the user u1 310, the communities may be determined to be the personal networks of the user u1 310, and accordingly the personal networks of the user u1 310, that is, the first user may be set to be in an extended range.

The document providing system 100 may register a first document prepared by the user u1 310, that is, that first user in the community associated with the first document, among the communities joined by each of the user u1 310, the user u2 320, and the user u3 330, corresponding to the personal networks of the user u1 310. A second document may be registered by a second user included in the community, and the second document may be provided to the first user in association with the first document.

Figure 5:
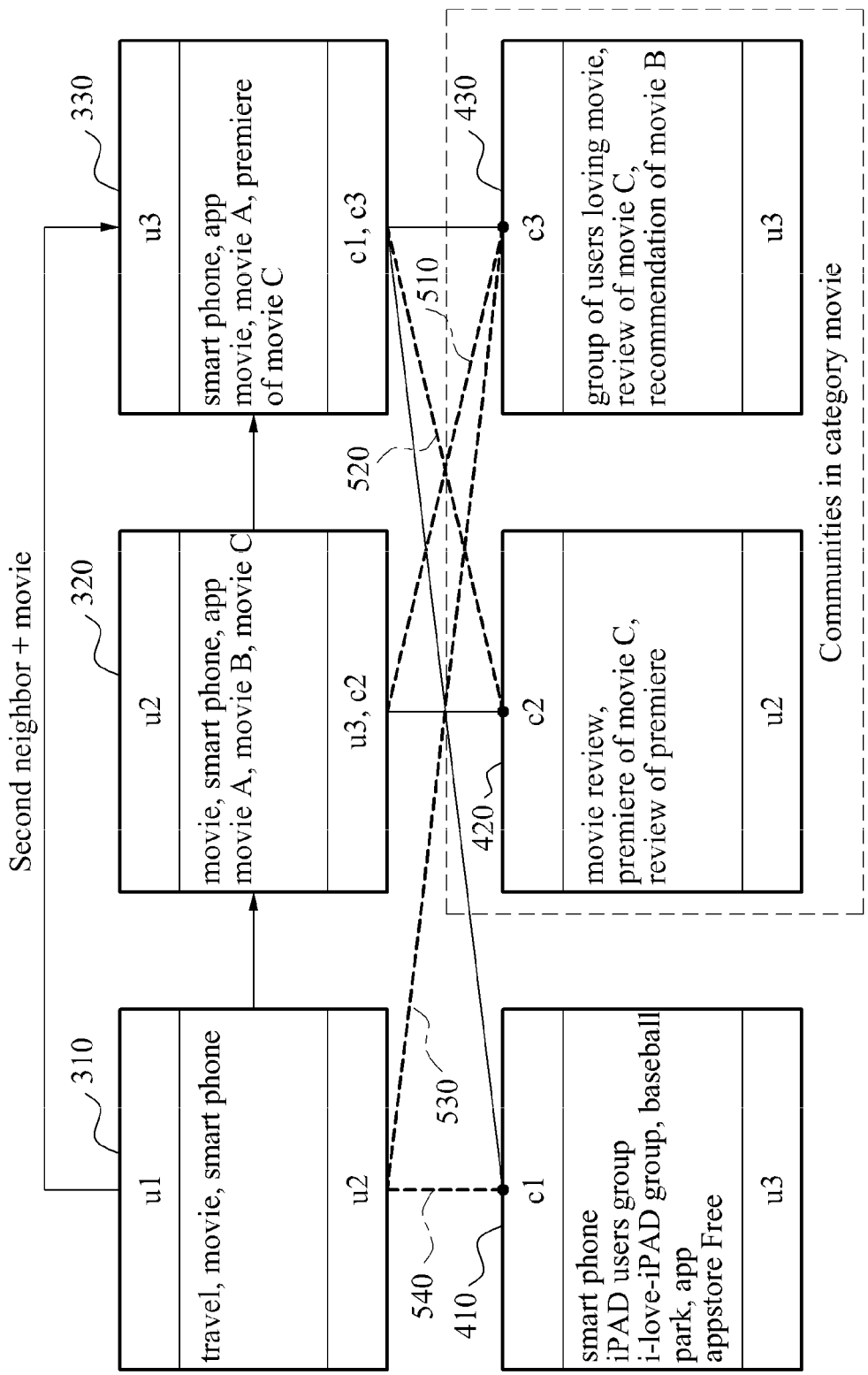
FIG. 5 is a diagram illustrating a process of recommending a community joined by a neighbor to a first user according to exemplary embodiments of the present invention.

FIG. 5 is a diagram illustrating a process of recommending communities joined by a neighbor to a first user according to exemplary embodiments of the present invention.

As aforementioned with reference to FIG. 4, the document providing system 100 may identify communities joined by the user u2 and the user u3. For example, the community joined by the user u2 may correspond to a community c2, and the community joined by the user u3 may correspond to a community c3. That is, the user u2 and the user u3 may correspond to neighbors of the first user u1 having prepared a first document corresponding to a query.

Also, the document providing system 100 may receive a second document corresponding to a response, registered by a second user who has joined communities c1, c2, and c3 not yet joined by the user u1, with respect to the first document corresponding to the query prepared by the user u1.

The document providing system 100 may receive, from the user u1, join requests for the communities c1, c2, and c3 not yet joined by the user u1. The communities c1, c2, and c3 may attract the user u1 who may be likely to actively participate in the communities, as a member.

The first user may receive recommended communities joined by a neighbor extracted based on keywords included in a document prepared by the first user, among communities not yet joined by the first user. A personal network of the first user may be extended when the first user joins the recommended communities. Also, a response with respect to the first document prepared by the first user may be registered by a second user included in a community set to be the personal network.

Referring to FIG. 5, for example, the community c2 420 and the community c3 430 may be related to a keyword "movie" included in a document prepared by the user u1 310. An association with the user u1 310, among the personal networks of the user u1 310, may be calculated, and communities which may be included in a predetermined ranking and not yet be joined by the user u1 310, for example, the community c1 410, the community c2 420, and the community c3 430, may be recommended to the user u1 310. When the user u1 310 joins the community c1 410 and the community c3 430, a social network may be extended and also the interests of the user u1 310 may be more obviously clarified.

Figure 6:
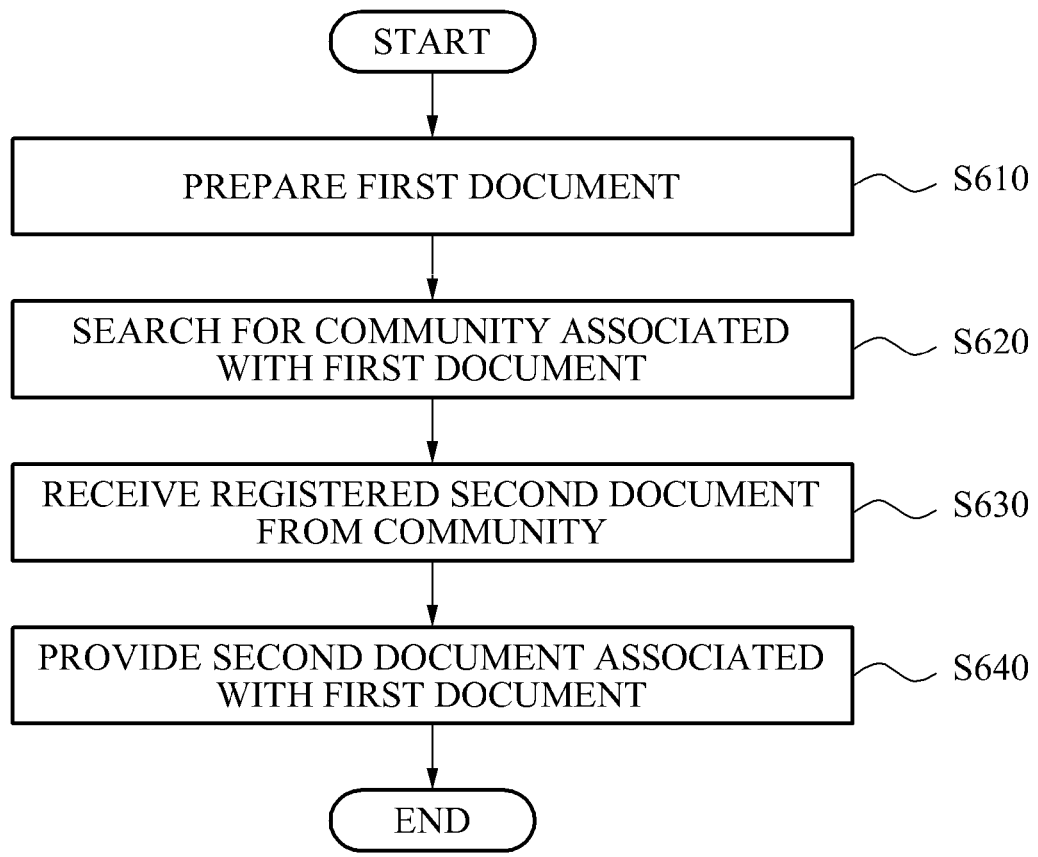
FIG. 6 is a flowchart of a process for illustrating a method of providing a document according to exemplary embodiments of the present invention.

FIG. 6 is a flowchart of a process for illustrating a method of providing a document according to exemplary embodiments of the present invention.

In S610, the document providing system may collect a first document prepared by a first user. The first user may prepare the first document corresponding to a query in multiple sites, and the prepared first document may be integrally managed through a first interface.

In S620, the document providing system may search for a community associated with the first document prepared by the first user. For example, the document providing system may search for the community associated with the first document based on keywords included in a user profile of the first user, and keywords included in the first document.

In particular, the document providing system may search for the community associated with the first document, among communities joined by the first user, or communities joined by a neighbor having similar interests to that of the first user. In this example, the neighbor may be extracted based on an association between the keywords included in the user profile of the first user, and keywords included in a user profile of another user. Here, the neighbor may include neighbors extending from a first neighbor to an Nth neighbor.

For example, the document providing system may provide, to the first user, a candidate community group including at least one community associated with the first document. The first user may select at least one community, among communities included in the candidate community group.

The document providing system may search for a community associated with a document corresponding to the profile of the first user, among documents prepared by the first user. In this example, the profile of the first user may include representative keywords extracted based on a frequency of the keywords included in the documents prepared by the first user.

In step S630, the document providing system may receive a second document, registered by a second user included in the community, associated with the first document. For example, the document providing system may transfer the first document prepared by the first user to the community, and may receive the second document registered by the second user included in the community. As aforementioned, the first document may refer to a query prepared by the first user, and the second document may refer to a response registered by the second user with respect to the first document.

In this example, the document providing system may provide, to the second user, the first document prepared by the first user, through an interface where the first document may be displayed to be distinguished from a third document registered in the community. The second user may easily register the response with respect to the first document through the interface.

In step S640, the document providing system may provide, to the first user, the second document associated with the first document. The document providing system may provide the second document, through the interface that may integrally manage the first document prepared by the first user, and the second document corresponding to the response with respect to the first document. The first user may receive the second document with respect to the first document from communities joined by the first user, or joined by the neighbor of the first user, without inputting the first document to the communities by searching for the first document prepared by the first user separately.

The first user may transfer a join request to the community providing the second document corresponding to a response that the first user may desire. Also, the community may attract the first user who may be likely to actively participate in the community, as a member.

One of ordinary skill in the art would recognize that a system and method for providing document based on personal network may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 7.

Figure 7:
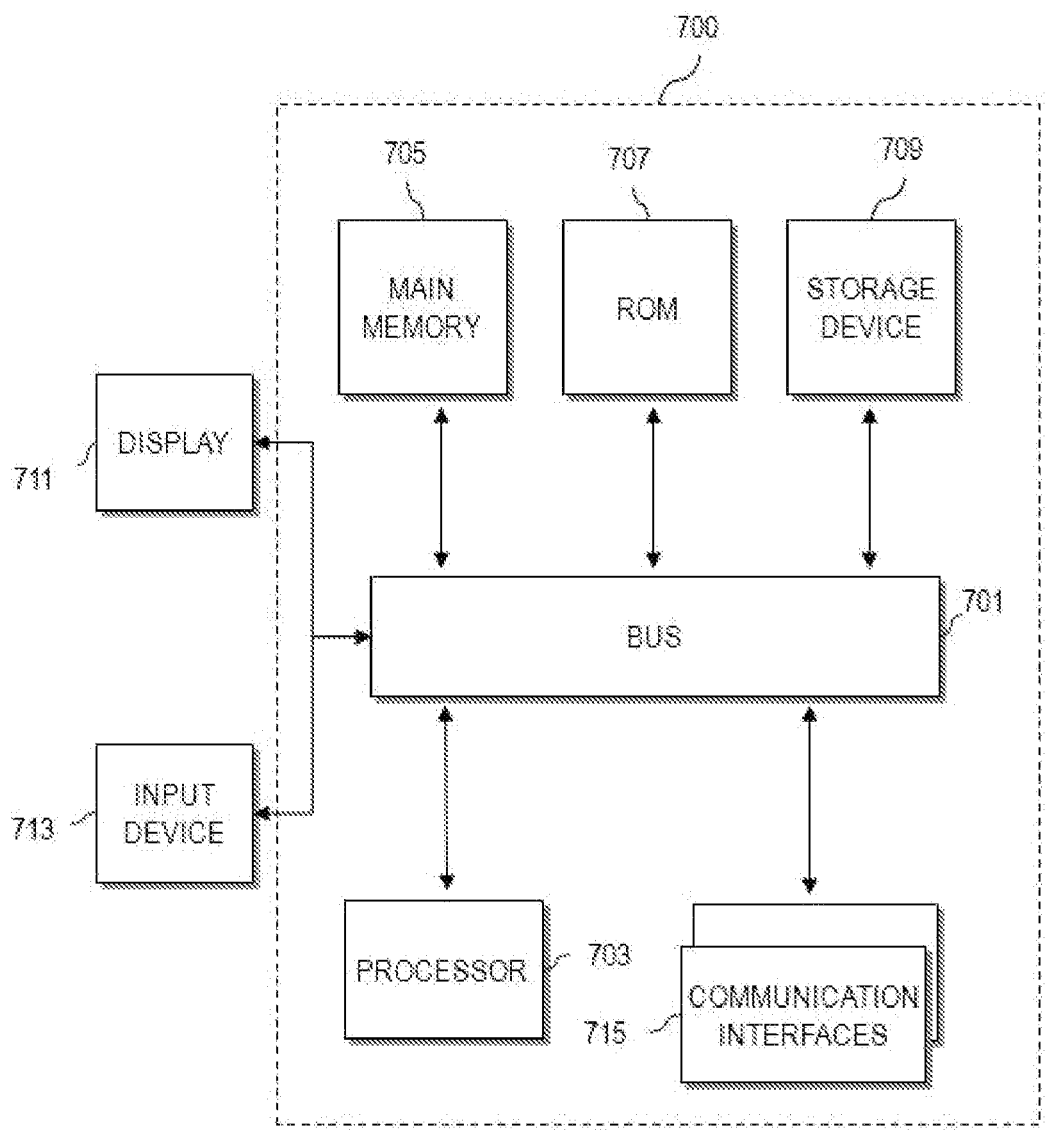
FIG. 7 is a diagram of hardware that can be used to implement an embodiment of the present invention.

FIG. 7 illustrates exemplary hardware upon which various embodiments of the invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled via the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to various embodiments of the invention, the processes described herein can be provided by the computing system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system using a server comprising a processor for providing a social network service, the system comprising:
a community searching unit configured to extract a profile of a first user based on a frequency of keywords in a first document received from the first user and to determine communities by searching for one or more communities based on whether the one or more communities currently having similar interests to that of the first user, the determination is being performed according to the profile based on a time interval;
a document registration unit, executable by the processor, configured to transfer the first document to the one or more determined communities, and to receive a second document related to the first document, the first document being displayed to users of the one or more searched communities via a first interface, and the second document being displayed to the first user via a second interface, the first document and the second document being displayed in a manner distinguished from a third document using the first interface and the second interface, the third document having been registered in the one or more searched communities; and
a document providing unit configured to provide the second document to the first user not registered as part of the one or more searched communities.

2. The system of claim 1, wherein the community searching unit is configured to receive a join request for joining the one or more searched communities providing the second document associated with the first document.

3. The system of claim 1, wherein
the second document corresponds to a response with respect to the first document.

4. The system of claim 1, wherein
the community searching unit is configured to provide, to the first user, a candidate community group comprising at least one community associated with the first document, and the document registration unit is configured to receive the second document registered by a second user in a community selected by the first user from the at least one community of the candidate community group.

5. A method using a processor for providing a social network service, the method comprising:
extracting a profile of a first user based on a frequency of keywords of a first document received from the first user;
determining communities by searching for one or more communities associated with a first document based on whether the one or more communities currently having similar interests to that of the first user, the determination is being performed according to the extracted profile with a time interval;
transferring the first document to the one or more determined communities and receiving a second document related to the first document, the first document being displayed to a second user corresponding to the one or more determined communities using a first interface and the second document being displayed to the first user using a second interface, the first user not being registered as part of the one or more searched communities, and the first document and the second document being displayed using the first and the second interface in a manner distinguished from a third document which had been registered in the one or more searched communities.

6. The method of claim 5, further comprising:
receiving a join request for the joining the one or more searched communities providing the second document associated with the first document.

7. The method of claim 5, further comprising:
providing, to the first user, a candidate community group comprising at least one community associated with the first document, and
receiving the registered second document from a community selected by the first user from the at least one community of the candidate community group.

8. The method of claim 5, further comprising:
searching for the one or more communities associated with the first document using keywords of a user profile of the first user and keywords of the first document.

9. A server comprising:
a processor configured to extract profiles of users based on a frequency of keywords of a plurality of documents received from the users comprising a first user and a second user, the extraction of the profiles being performed based on a time interval and
to search for one or more communities based on whether the one or more communities currently having similar interests to that of the first user, the determination is being performed associated with a first document corresponding to a first profile of the first user by comparing a keyword of the first document with a keyword of a second document corresponding to a second profile of the second user of the one or more searched communities, wherein the second document is retrieved from the one or more searched communities, and wherein the first document corresponding to the first profile of the first user is displayed to the second user and the second document corresponding to the second profile of the second user is displayed to the first user via an interface, the first document and the second document being displayed distinguished from a third document using the interface, the third document having been registered in the one or more searched communities, and the first user not being registered as part of the one or more searched communities.

10. The apparatus of claim 9, wherein the first profile and the second profile comprise at least one of user identification (ID) information of the first user and the second user, keywords of the respective first document and the second document, or ID information of the searched network community.

* * * * *